US011854271B2

(12) United States Patent
Yasui

(10) Patent No.: US 11,854,271 B2
(45) Date of Patent: Dec. 26, 2023

(54) SYSTEM, COMPUTER-READABLE STORAGE MEDIUM, AND INFORMATION PROCESSING METHOD

(71) Applicant: HONDA MOTOR CO., LTD., Tokyo (JP)

(72) Inventor: Yuji Yasui, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 311 days.

(21) Appl. No.: 17/174,364

(22) Filed: Feb. 12, 2021

(65) Prior Publication Data

US 2021/0256277 A1    Aug. 19, 2021

(30) Foreign Application Priority Data

Feb. 17, 2020    (JP) .................................. 2020-024330

(51) Int. Cl.
*G06V 20/58* (2022.01)
*H04W 8/00* (2009.01)
(Continued)

(52) U.S. Cl.
CPC ............... *G06V 20/58* (2022.01); *G06T 7/20* (2013.01); *G06V 40/10* (2022.01); *G08B 7/06* (2013.01); *H04W 8/005* (2013.01); *G06T 2207/30196* (2013.01); *G06T 2207/30261* (2013.01)

(58) Field of Classification Search
CPC ...... G06V 20/58; G06V 40/10; G06V 40/103; G06T 7/20; G06T 2207/30196; G06T 2207/30261; G08B 7/06; G08B 21/22; G08B 21/02; G08B 29/188; H04W 8/005; H04W 4/40; G08G 1/166
See application file for complete search history.

(56) References Cited

U.S. PATENT DOCUMENTS

2010/0124358 A1* 5/2010 Huang ................... G06V 40/23
                                                        382/103
2015/0251599 A1* 9/2015 Koravadi ................ G01S 19/42
                                                        340/903

(Continued)

FOREIGN PATENT DOCUMENTS

CN       108540756 A    9/2018
JP       2006163637 A    6/2006
(Continued)

OTHER PUBLICATIONS

Translation of CN108540756 (Year: 2018).*

(Continued)

*Primary Examiner* — Carol Wang

(57) ABSTRACT

Provided is a system including a record unit for recording identification information of an information terminal and appearance information of a moving object associated with the information terminal in association with each other. The system includes an acquisition unit for acquiring information representing an appearance of a moving object to be notified. The system includes an identification information specification unit for specifying the identification information recorded by the record unit in association with the appearance information matching the information acquired by the acquisition unit.

15 Claims, 9 Drawing Sheets

(51) Int. Cl.
*G08B 7/06* (2006.01)
*G06T 7/20* (2017.01)
*G06V 40/10* (2022.01)

(56) References Cited

U.S. PATENT DOCUMENTS

2020/0349843 A1* 11/2020 Liu ........................ G08G 1/005
2021/0334854 A1* 10/2021 Ueno ..................... G08G 1/005
2022/0022013 A1* 1/2022 Balasubramanian ........................
G06V 40/161

FOREIGN PATENT DOCUMENTS

| JP | 2012038089 A | | 2/2012 |
| JP | 2012178127 A | * | 9/2012 |
| JP | 2016009448 A | * | 1/2016 |
| JP | 2019028916 A | * | 2/2019 |
| JP | 2019040496 A | | 3/2019 |
| KR | 20000054784 A | * | 9/2000 |
| WO | 2019198449 A1 | | 10/2019 |

OTHER PUBLICATIONS

Translation of JP2012-178127 (Year: 2012).*
Office Action issued for counterpart Chinese Application 202110177355. 8, issued by the China National Intellectual Property Administration dated Jun. 30, 2022.
Office Action issued for counterpart Japanese Application No. 2020-024330, issued by the Japanese Patent Office dated Aug. 29, 2023 (drafted on Aug. 24, 2023).

* cited by examiner

| TERMINAL ID | CATEGORY | APPEARANCE INFORMATION | TIME |
|---|---|---|---|
| ID001 | PERSON | RED T-SHIRT | T1 |
| ID002 | PERSON | BLACK COAT BLOWN HAT SUNGLASSES | T2 |
| ID003 | PERSON | WHITE CLOTHES | T3 |
| ID004 | AUTOMOBILE | GREEN TOP | T4 |
| ID005 | PERSON | RED T-SHIRT | T5 |
| ⋮ | ⋮ | ⋮ | ⋮ |

*FIG. 5*

| TERMINAL ID | CURRENT LOCATION INFORMATION |
|---|---|
| ID001 | LOCATION 1 |
| ID002 | LOCATION 2 |
| ID003 | LOCATION 1 |
| ID004 | LOCATION 4 |
| ID005 | LOCATION 5 |
| ... | ... |

*FIG. 6*

SYSTEM, COMPUTER-READABLE STORAGE MEDIUM, AND INFORMATION PROCESSING METHOD

CROSS REFERENCE TO RELATED APPLICATION

The contents of the following Japanese patent application are incorporated herein by reference, Japanese Patent Application NO. 2020-024330 filed on Feb. 17, 2020.

BACKGROUND

1. Technical Field

The present invention relates to a system, a computer-readable storage medium, and an information processing method.

2. Related Art

Patent document 1 describes "an image recognition unit 12 is configured to recognize whether there is a pedestrian, so that if there is a pedestrian, . . . a possibility (degree of risk) of contact between the pedestrian and an own vehicle is calculated, . . . a notification means is controlled to execute a notification processing corresponding to the degree of risk".

PRIOR ART DOCUMENT

Patent Document

Patent Document 1: Japanese Patent Application Publication No. 2006-163637

BRIEF DESCRIPTION OF THE DRAWINGS

FIG. 5 shows a configuration of a data structure of moving object appearance information.
FIG. 6 shows a configuration of a data structure of terminal location information.

DESCRIPTION OF EXEMPLARY EMBODIMENTS

Hereinafter, the present invention will be described through the embodiments of the invention, but the following embodiments do not limit the claimed invention. Moreover, not all combinations of features described in the embodiments are essential to solutions of the invention.

Figure 1:
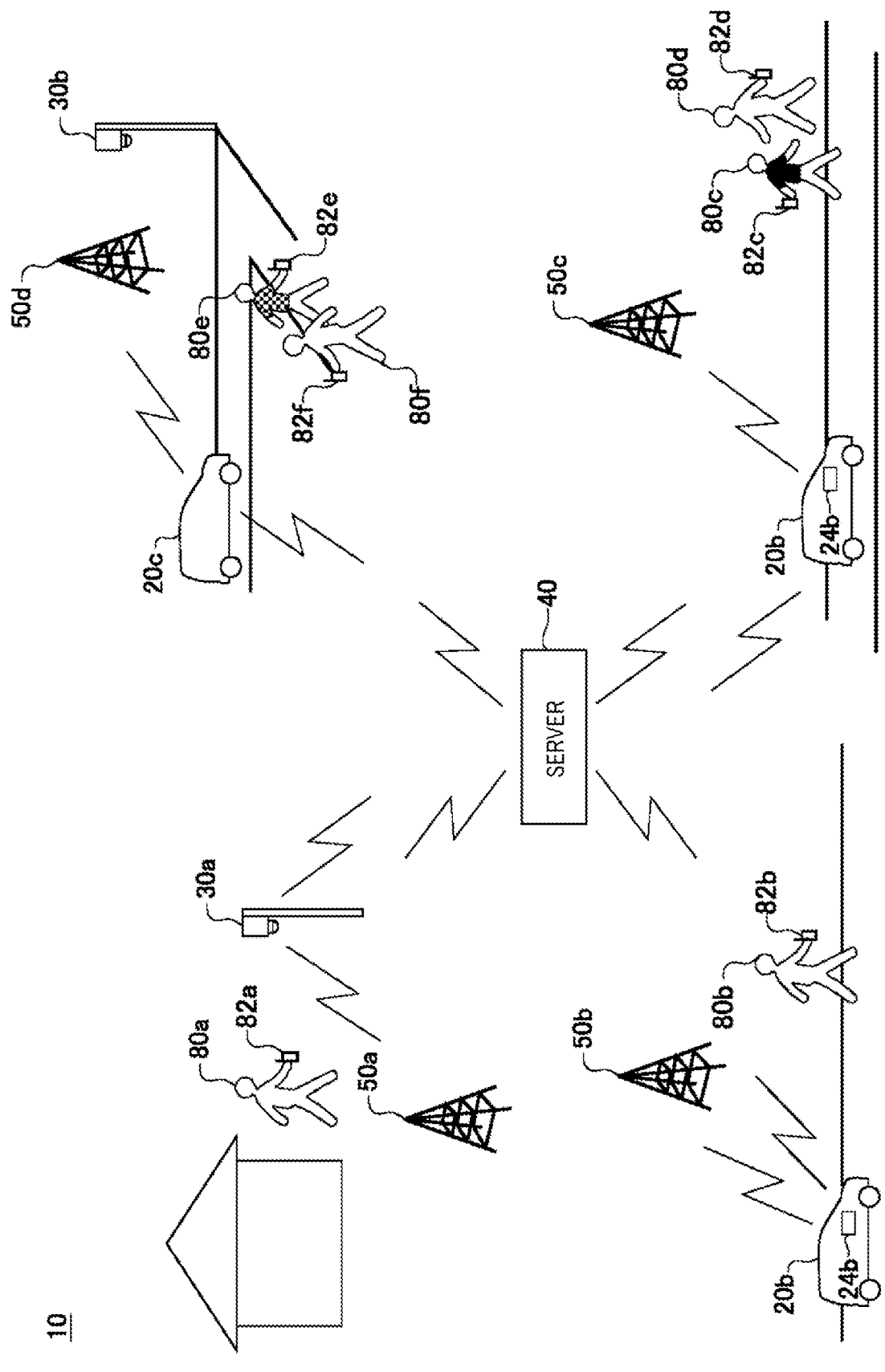
FIG. 1 shows an overall configuration of a system 10.

FIG. 1 shows an overall configuration of a system 10. The system 10 includes a vehicle 20, a roadside apparatus 30, a server 40, and a radio station 50. In this embodiment, a plurality of vehicles including a vehicle 20a, a vehicle 20b, a vehicle 20c, and a vehicle 20d are collectively referred to as the "vehicle 20". Moreover, information processing apparatuses included in the vehicle 20, including an information processing apparatus 24a included in the vehicle 20a and an information processing apparatus 24b included in the vehicle 20b, are collectively referred to as an "information processing apparatus 24". Moreover, a plurality of roadside apparatuses including a roadside apparatus 30a and a roadside apparatus 30b are collectively referred to as the "roadside apparatus 30". Moreover, a plurality of radio stations including a radio station 50a, a radio station 50b, a radio station 50c, and a radio station 50d are collectively referred to as the "radio station 50".

In this embodiment, the system 10 is a notification control system for giving notification to a person 80 hindering a traveling of the vehicle 20. In this embodiment, a person 80a, a person 80b, a person 80c, a person 80d, and a person 80e will be described as notification targets. Note that a plurality of persons including the person 80a, the person 80b, the person 80c, the person 80d, the person 80e, and a person 80f are collectively referred to as the "person 80". A plurality of information terminals including an information terminal 82a, an information terminal 82b, an information terminal 82c, an information terminal 82d, an information terminal 82e, and an information terminal 82f may be collectively referred to as an "information terminal 82".

The radio station 50 is configured to provide wireless communication to and from the information terminals 82 each located in a predetermined communication area. The radio station 50 is a communication station fixed on land for communicating with the information terminals 82. For example, the radio station 50 is a base station for mobile communication. The radio station 50 may be a small cell such as a microcell or a nanocell. The radio station 50 may be a macrocell.

The roadside apparatus 30 is provided on a roadside of a road. The roadside apparatus 30 includes a camera. The roadside apparatus 30 is configured to acquire information representing clothing of the person 80 from image information captured by the camera. The roadside apparatus 30 is configured to acquire a terminal ID of the information terminal 82 located around the roadside apparatus 30 from the radio station 50. The roadside apparatus 30 is configured to enregister, in the server 40, clothing information representing features of the clothing of the person 80 and the terminal ID in association with each other. As an example, when the person 80a goes out from indoors to outdoors, the roadside apparatus 30a is configured to generate moving object appearance information associating a terminal ID of the person 80a acquired from the radio station 50a and clothing information of the person 80a, and to enregister it in the server 40. The roadside apparatus 30 is provided in every place, and is configured to collect moving object appearance information of many persons 80.

The vehicle 20a includes the information processing apparatus 24a. When the information processing apparatus 24a determines, based on image information captured by a camera included in the vehicle 20, that there is a person 80b hindering the traveling of the vehicle 20, the information processing apparatus 24a is configured to acquire current location information and the terminal ID of the information terminal 82 managed by the radio station 50b. The radio station 50b is a radio station responsible for wireless communication in a communication area including an imaging area of the camera included in the vehicle 20. The information processing apparatus 24a is configured to specify a terminal ID of the information terminal 82b based on the current location information of the information terminal 82. As an example, when there is no information terminal other than the information terminal 82*b* in the communication area of the radio station 50*b*, the information terminal 82*b* can be determined to be an information terminal 82 carried by the person 80*b* to be notified. The information processing apparatus 24*a* is configured to transmit notification information to the information terminal 82*b* identified by the terminal ID. Once receiving the notification information, the information terminal 82*b* gives notification to the person 80*b* by a warning sound, a vibration, or the like.

Next, it is assumed that the information processing apparatus 24*b* of the vehicle 20*b* detects presence of the person 80*c* who may hinder a traveling of the vehicle 20*b*. It is assumed that the information processing apparatus 24*b* determines that there is a person 80*d* near the person 80*c* and that the person 80*d* does not hinder the traveling of the vehicle 20*b*. In this case, there is a possibility that the information terminal 82*b* and the information terminal 82*c* cannot be distinguished from each other only by the current location information of the information terminal 82 managed by the radio station 50. In this case, the information processing apparatus 24*b* is configured to acquire information representing clothing of the person 80*c* from an image captured by a camera included in the vehicle 20*b*. The information processing apparatus 24*b* is configured to specify clothing information matching the clothing of the person 80*c* out of moving object appearance information received from the server 40, and to specify a terminal ID associated with the clothing information. The information processing apparatus 24*b* is configured to transmit notification information to the specified terminal ID. This allows the notification information to be transmitted only to the information terminal 82*c*.

As described above, there is a possibility that the information terminal 82 to which the notification information is transmitted cannot be specified only by the current location information of the information terminal 82, such as when the persons 80 are closely spaced. In this case, the information processing apparatus 24 is configured to specify the information terminal 82 to be notified, by using clothing information of the person 80. This allows the notification information to be transmitted only to the information terminal 82 required to be transmitted the notification information, and can prevent the notification information to be transmitted to the information terminal 82 required not to be transmitted the notification information.

Note that the roadside apparatus 30*b* may include a function to transmit notification information to the information terminal 82, as with the vehicle 20. For example, when there are a person 80*e* who may hinder a traveling of the vehicle 20*c* around the roadside apparatus 30*b* and a person 80*f* who does not hinder the traveling of the vehicle 20*c*, according to the image around the roadside apparatus 30*b*, the roadside apparatus 30*b* is configured to specify a terminal ID associated with clothing information matching clothing information of the person 80*e* who may hinder the traveling of the vehicle 20*c*, with reference to the moving object appearance information received from the server 40 and the current location information of the information terminal 82 received from the radio station 50*d*. Then, the roadside apparatus 30*b* is configured to transmit notification information addressed to the specified terminal ID.

Moreover, the information processing apparatus 24 of the vehicle 20 may include a function to generate moving object appearance information, as with the roadside apparatus 30. For example, the information processing apparatus 24 may be configured to extract the information representing the clothing of the person 80 from the image information captured by the camera, to generate moving object appearance information associating the clothing information and the terminal ID of the information terminal 82 of the person 80, and to enregister it in the server 40.

Figure 2:
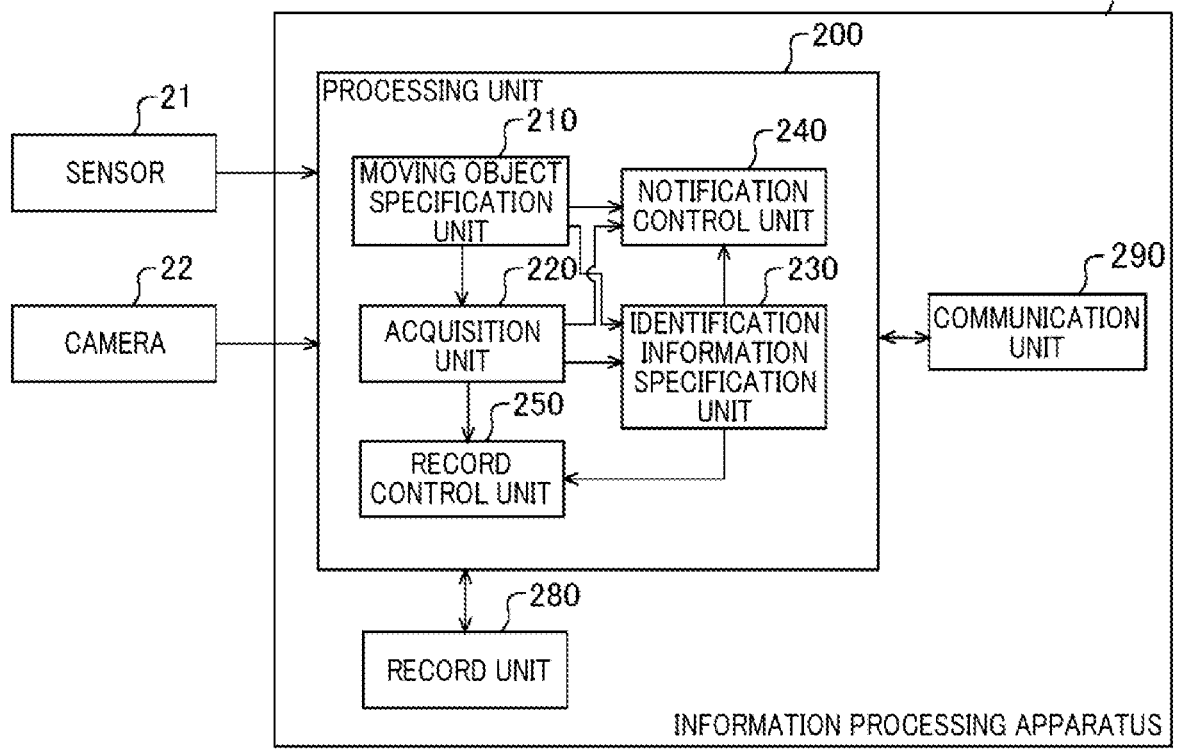
FIG. 2 shows a system configuration of a vehicle 20.

FIG. 2 shows a system configuration of the vehicle 20. The vehicle 20 includes a sensor 21, a camera 22, and an information processing apparatus 24. The sensor 21 includes a radar such as LiDAR or a millimeter wave radar. The sensor 21 includes a location sensor such as a GPS (Global Positioning System) or an odometer. The sensor 21 includes an IMU (Inertial Measurement Unit) such as an acceleration sensor or an attitude sensor.

The camera 22 is configured to capture a periphery of the vehicle 20 to generate image information. The camera 22 is configured to capture an image in a traveling direction of the vehicle 20 to generate image information.

The information processing apparatus 24 includes a processing unit 200, a record unit 280, and a communication unit 290. The processing unit 200 is realized, for example, by an arithmetic processing apparatus including a processor. The record unit 280 is realized by including a non-volatile storage medium. The processing unit 200 is configured to perform a processing by using information stored in the record unit 280. The communication unit 290 is responsible for communication with the radio station 50, communication with the server 40, and communication with the information terminal 82.

The record unit 280 is configured to record identification information of the information terminal 82 and appearance information of the person 80 associated with the information terminal 82 in association with each other. The record unit 280 may be configured to record the moving object appearance information received from the server 40. The appearance information of the person 80 may include information representing clothing. The appearance information of the person 80 is, for example, a color or a type of garment or accessory of the person 80, or the like. Note that the person 80 is an example of a moving object. Transportation equipment including the vehicle 20 may be a "moving object". When the transportation equipment is a moving object, equipment having a communication function such as a telematics control unit included in the transportation equipment may be an "information terminal". In this embodiment, the person 80 will be mainly taken as the "moving object".

The processing unit 200 includes a moving object specification unit 210, an acquisition unit 220, an identification information specification unit 230, a notification control unit 240, and a record control unit 250. The moving object specification unit 210 is configured to specify the person 80 to be notified, based on the image information captured by the camera 22 and information collected by the sensor 21. For example, the moving object specification unit 210 is configured to specify a location where exists the person 80 to be notified.

The acquisition unit 220 is configured to acquire information representing an appearance of the person 80 to be notified. For example, the acquisition unit 220 is configured to acquire the information representing the appearance the the person 80 to be notified, from image information of one or more persons 80 captured by the camera 22. For example, the acquisition unit 220 is configured to acquire the information representing the appearance from an object at a location corresponding to the person 80 specified by the moving object specification unit 210, among the image information captured by the camera 22. Thus, when there is a person 80 hindering the traveling of the vehicle 20, the acquisition unit 220 is configured to specify the appearance information of the person 80 hindering the traveling of the vehicle 20, from the image information, and to acquire the specified appearance information as the appearance information of the person 80 to be notified.

The identification information specification unit 230 is configured to specify a terminal ID recorded by the record unit 280 in association with appearance information matching the information acquired by the acquisition unit 220. The notification control unit 240 is configured to cause notification to be given to the information terminal 82 specified from the terminal ID specified by the identification information specification unit 230. For example, the notification control unit 240 is configured to generate notification information addressed to the information terminal 82 of the terminal ID specified by the identification information specification unit 230, and to cause the communication unit 290 to transmit the notification information through the radio station 50. The notification control unit 240 may be configured to transmit the notification information directly to the information terminal 82. The notification control unit 240 may be configured to transmit the notification information through the server 40 to the information terminal 82.

When the person 80 to be notified cannot be specified, the identification information specification unit 230 is configured to specify the terminal ID recorded by the record unit 280 in association with the appearance information matching the information acquired by the acquisition unit 220. For example, when a number of the person 80 captured by the camera 22 exceeds a predetermined number, the identification information specification unit 230 is configured to specify the terminal ID recorded by the record unit 280 in association with the appearance information matching the information acquired by the acquisition unit 220. For example, current location information of the information terminal 82 managed by the radio station 50 includes a certain level of error. Therefore, when a plurality of persons 80 exist in an area of the error range, it may not be possible to specify each of the persons 80. Therefore, when presence density of the persons 80 is high, the identification information specification unit 230 is configured to determine that the terminal ID cannot be specified from the current location information of the information terminal 82, and to specify the terminal ID by using the appearance information.

The record control unit 250 is configured to, when the terminal ID of the person 80 captured by the camera 22 can be specified, cause the record unit 280 to record the appearance information of the person 80 captured by the camera 22 and the terminal ID of the person 80 captured by the camera 22 in association with each other. Specifically, the acquisition unit 220 is configured to extract the appearance information of the person 80 captured by the camera 22. When the number of the persons 80 captured by the camera 22 does not exceed the predetermined number, the identification information specification unit 230 is configured to specify the terminal ID of the person 80 captured by the camera 22, based on terminal location information associating the current location information of the information terminal 82 and the terminal ID of the person 80. Then, the record control unit 250 is configured to cause the record unit 280 to record the appearance information acquired by the acquisition unit 220 and the terminal ID specified by the identification information specification unit 230 based on the terminal location information in association with each other. Note that the record control unit 250 may be configured to transmit moving object appearance information through the communication unit 290 to the server 40, and to cause the moving object appearance information to be recorded in the server 40.

Note that the identification information specification unit 230 may be configured to specify the terminal ID of the information terminal 82 to be notified, by causing the information representing the appearance of the person 80 acquired by the acquisition unit 220 to be transmitted to the server 40 and by acquiring, from the server 40, the identification information of the information terminal 82 specified in the server 40. Moreover, the notification control unit 240 may be configured to cause the information representing the appearance of the person 80 acquired by the acquisition unit 220 and information representing the imaging area of the camera 22, to be transmitted to the server 40, and to cause notification to be given from the server 40 to the information terminal 82.

Figure 3:
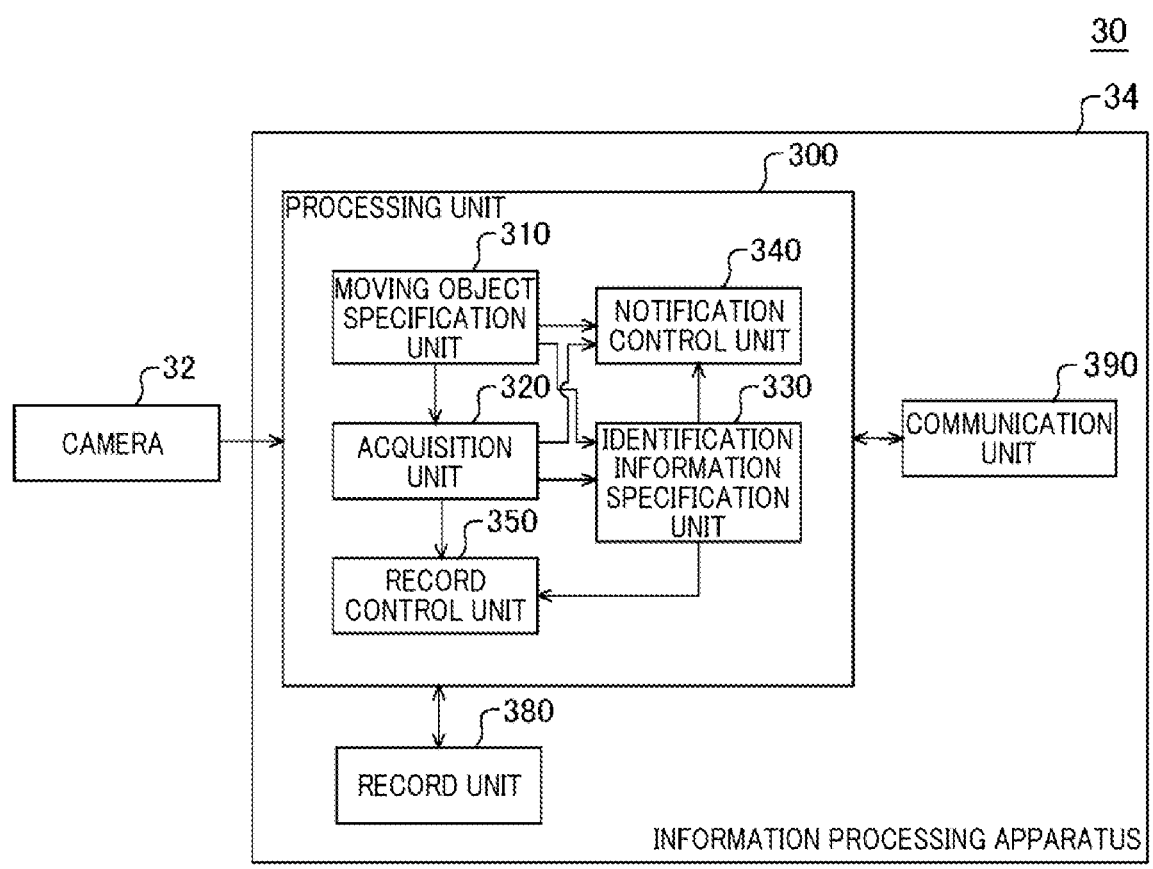
FIG. 3 shows a system configuration of a roadside apparatus 30.

FIG. 3 shows a system configuration of the roadside apparatus 30. The roadside apparatus 30 includes a camera 32 and an information processing apparatus 34. The camera 32 is configured to capture a periphery of the roadside apparatus 30 to generate image information.

The information processing apparatus 34 includes a processing unit 300, a record unit 380, and a communication unit 390. The processing unit 300 is realized, for example, by an arithmetic processing apparatus including a processor. The record unit 380 is realized by including a non-volatile storage medium. The processing unit 300 is configured to perform a processing by using information stored in the record unit 380. The communication unit 390 is responsible for communication with the radio station 50, communication with the server 40, and communication with the information terminal 82.

The record unit 380 is configured to record identification information of the information terminal 82 and appearance information of the person 80 associated with the information terminal 82 in association with each other. The record unit 380 may be configured to record the moving object appearance information received from the server 40.

The processing unit 300 includes a moving object specification unit 310, an acquisition unit 320, an identification information specification unit 330, a notification control unit 340, and a record control unit 350. The moving object specification unit 310, the acquisition unit 320, the identification information specification unit 330, the notification control unit 340, and the record control unit 350 respectively have functions similar to those of the moving object specification unit 210, the acquisition unit 220, the identification information specification unit 230, the notification control unit 240, and the record control unit 250. Therefore, explanation for the functions of the moving object specification unit 310, the acquisition unit 320, the identification information specification unit 330, the notification control unit 340, and the record control unit 350 may be omitted, except for differences from the functions provided in the moving object specification unit 210, the acquisition unit 220, the identification information specification unit 230, the notification control unit 240, and the record control unit 250.

The moving object specification unit 310 is configured to specify the person 80 to be notified, based on the image information captured by the camera 32. Based on the image information captured by the camera 32, the moving object specification unit 310 is configured to specify, among the persons 80 around the roadside apparatus 30, the person 80 who may hinder the traveling of the vehicle 20 around the roadside apparatus 30, as the person 80 to be notified.

The acquisition unit 320 is configured to acquire information representing an appearance of the person 80 to be notified. Specifically, the acquisition unit 320 is configured to acquire the information representing the appearance the the person 80 to be notified, from image information of one or more persons 80 captured by the camera 32. For example, the acquisition unit 320 is configured to acquire the information representing the appearance from an object of the person 80 specified by the moving object specification unit 310, among the image information captured by the camera 32. Thus, when there is a person 80 hindering the traveling of the vehicle 20, the acquisition unit 320 is configured to specify the appearance information of the person 80 hindering the traveling of the vehicle 20, from the image information, and to acquire the specified appearance information as the appearance information of the person 80 to be notified.

The identification information specification unit 330 is configured to specify a terminal ID recorded by the record unit 380 in association with appearance information matching the information acquired by the acquisition unit 320. The notification control unit 340 is configured to cause notification to be given to the information terminal 82 specified from the terminal ID specified by the identification information specification unit 330. For example, the notification control unit 340 is configured to generate notification information addressed to the information terminal 82 of the terminal ID specified by the identification information specification unit 330, and to cause the communication unit 390 to transmit the notification information through the radio station 50. The notification control unit 340 may be configured to transmit the notification information directly to the information terminal 82. The notification control unit 340 may be configured to transmit the notification information through the server 40 to the information terminal 82.

When the person 80 to be notified cannot be specified, the identification information specification unit 330 is configured to specify the terminal ID recorded by the record unit 380 in association with the appearance information matching the information acquired by the acquisition unit 320. For example, when a number of the person 80 captured by the camera 32 exceeds a predetermined number, the identification information specification unit 330 is configured to specify the terminal ID recorded by the record unit 380 in association with the appearance information matching the information acquired by the acquisition unit 320. For example, when presence density of the persons 80 is high, the identification information specification unit 330 is configured to determine that the terminal ID cannot be specified from the current location information of the information terminal 82, and to specify the terminal ID by using the appearance information.

The record control unit 350 is configured to, when the terminal ID of the person 80 captured by the camera 32 can be specified, cause the record unit 380 to record the appearance information of the person 80 captured by the camera 32 and the terminal ID of the person 80 captured by the camera 32 in association with each other. Specifically, the acquisition unit 320 is configured to extract the appearance information of the person 80 captured by the camera 32. When the number of the persons 80 captured by the camera 32 does not exceed the predetermined number, the identification information specification unit 330 is configured to specify the terminal ID of the person 80 captured by the camera 32, based on terminal location information associating the current location information of the information terminal 82 and the terminal ID of the person 80. Then, the record control unit 350 is configured to cause the record unit 380 to record the appearance information acquired by the acquisition unit 320 and the terminal ID specified by the identification information specification unit 330 based on the terminal location information in association with each other. Note that the record control unit 350 may be configured to transmit moving object appearance information through the communication unit 390 to the server 40, and to cause the moving object appearance information to be recorded in the server 40.

Note that the acquisition unit 320 may be configured to extract the appearance information of the person 80 from image information captured when the person 80 goes out from indoors to outdoors. The record control unit 250 may be configured to cause the record unit 280 to record the appearance information of the person extracted by the acquisition unit 320 and the terminal ID specified by the identification information specification unit 330 based on the terminal location information in association with each other.

Note that the identification information specification unit 330 may be configured to specify the terminal ID of the information terminal 82 to be notified, by causing the information representing the appearance of the person 80 acquired by the acquisition unit 320 to be transmitted to the server 40 and by acquiring, from the server 40, the identification information of the information terminal 82 specified in the server 40. Moreover, the notification control unit 340 may be configured to cause the information representing the appearance of the person 80 acquired by the acquisition unit 320 and information representing the imaging area of the camera 22, to be transmitted to the server 40, and to cause them to be notified from the server 40 to the information terminal 82.

Figure 4:
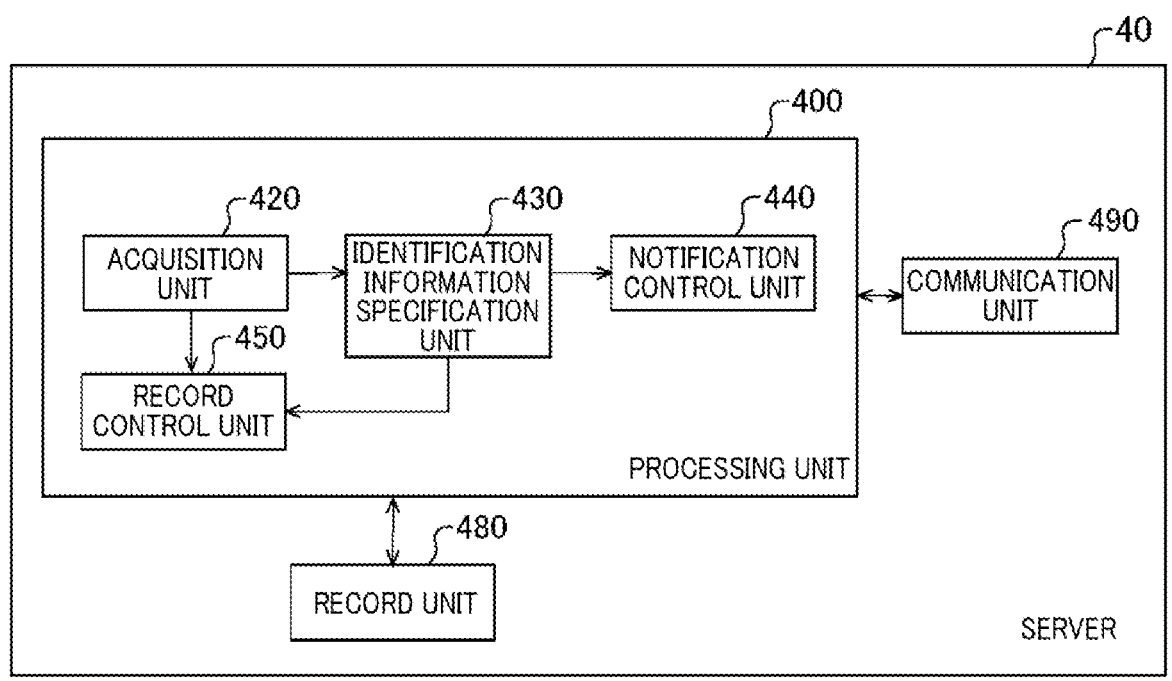
FIG. 4 shows a system configuration of a server 40.

FIG. 4 shows a system configuration of the server 40. The server 40 is an example of an information processing apparatus.

The server 40 includes a processing unit 400, a record unit 480, and a communication unit 490. The processing unit 400 is realized, for example, by an arithmetic processing apparatus including a processor. The record unit 480 is realized by including a non-volatile storage medium. The processing unit 400 is configured to perform a processing by using information stored in the record unit 480. The communication unit 490 is responsible for communication with the radio station 50, communication with the vehicle 20, and communication with the roadside apparatus 30.

The record unit 480 is configured to record identification information of the information terminal 82 and appearance information of the person 80 associated with the information terminal 82 in association with each other. The record unit 480 may be configured to record the moving object appearance information received from the vehicle 20. The record unit 480 may be configured to record the moving object appearance information received from the roadside apparatus 30.

The communication unit 490 may be configured to transmit the moving object appearance information recorded in the record unit 480 to the vehicle 20 and the roadside apparatus 30. For example, the processing unit 400 is configured to specify the terminal ID of the information terminal 82 located around a current location of the vehicle 20, based on terminal location information of the information terminal 82 collected from the radio station 50 and current location information of the vehicle 20. The communication unit 490 is configured to transmit, to the vehicle 20, moving object appearance information including appearance information associated with the specified terminal ID. The communication unit 490 may be configured to transmit the moving object appearance information to the vehicle 20 in response to receiving request information of the moving object appearance information from the vehicle 20.

Moreover, the information processing apparatus 24 is configured to specify the terminal ID of the information terminal 82 located around the roadside apparatus 30, based on the terminal location information of the information terminal 82 collected from the radio station 50 and location information of the roadside apparatus 30. The communication unit 490 is configured to transmit, to the roadside apparatus 30, the moving object appearance information including the appearance information associated with the specified terminal ID. The communication unit 490 may be configured to transmit the moving object appearance information to the roadside apparatus 30 in response to receiving request information of the moving object appearance information from the roadside apparatus 30.

Note that, the acquisition unit 420 may be configured to acquire information representing an appearance of the person 80 to be notified. For example, the acquisition unit 420 may be configured to acquire the information representing the appearance of the person 80 extracted by the acquisition unit 220 in the vehicle 20. The identification information specification unit 430 may be configured to specify a terminal ID recorded by the record unit 480 in association with appearance information matching the information acquired by the acquisition unit 420. The communication unit 490 may be configured to transmit, to the vehicle 20, the terminal ID specified by the identification information specification unit 430. Note that the acquisition unit 420 may be configured to acquire the information representing the appearance of the person 80 extracted by the acquisition unit 320 in the roadside apparatus 30. In this case, the communication unit 490 may be configured to transmit, to the roadside apparatus 30, the terminal ID specified by the identification information specification unit 430 based on the information representing the appearance acquired by the acquisition unit 420.

Moreover, the notification control unit 440 may be configured to cause notification to be given to the information terminal 82 identified by the terminal ID specified by the identification information specification unit 430. For example, the notification control unit 440 may be configured to generate notification information addressed to the information terminal 82 of the terminal ID specified by the identification information specification unit 430, and to cause the communication unit 490 to transmit the notification information through the radio station 50 to the information terminal 82.

Moreover, the server 40 may be configured to receive image information from the vehicle 20. The acquisition unit 420 may be configured to extract the information representing the appearance of the person 80 from the image information received from the vehicle 20. The identification information specification unit 430 may be configured to specify, based on the current location information of the vehicle 20 and the terminal location information acquired from the radio station 50, a terminal ID of the information terminal 82 of the person 80 whose appearance information has been extracted by the acquisition unit 420. The record control unit 450 may be configured to cause the record unit 480 to record the terminal ID specified by the identification information specification unit 430 and the information representing the appearance of the person 80 extracted by the acquisition unit 420 in association with each other. Similarly, the server 40 may be configured to receive image information from the roadside apparatus 30. The acquisition unit 420 may be configured to extract the information representing the appearance of the person 80 from the image information received from the roadside apparatus 30. The identification information specification unit 430 may be configured to specify, based on the location information of the roadside apparatus 30 and the terminal location information acquired from the radio station 50, a terminal ID of the information terminal 82 of the person 80 whose appearance information has been extracted by the acquisition unit 420. The record control unit 450 may be configured to cause the record unit 480 to record the terminal ID specified by the identification information specification unit 430 and the information representing the appearance of the person 80 extracted by the acquisition unit 420 in association with each other.

FIG. 5 shows a configuration of a data structure of moving object appearance information. The moving object appearance information associates a terminal ID, a category, appearance information, and the time.

Terminal IDs of the information terminals 82 are stored in "Terminal ID". The "terminal ID" is identification information uniquely specifying the information terminals 82. Information representing categories of moving objects associated with the information terminals is stored in "Category". The "category" may be information representing a "person", an "automobile", or the like. Appearance information of moving objects associated with the information terminals is stored in "Appearance Information". For example, when the category of a moving object is a "person", information representing a color or a category of garment or accessory such as a "red tee-shirt", a "black coat", a "blown hat", or "sunglasses" is stored in "Appearance Information". When the category of a moving object is an "automobile", information representing a color or a shape of vehicle body or the like as well as a category or a color of vehicle accessory such as a "green top" or the like, are stored in "Appearance Information". Information representing the times when the appearance information was acquired are stored in "Time".

The identification information specification unit 230 is configured to specify the terminal ID associated with the appearance information matching the information of the appearance extracted by the acquisition unit 220, with reference to the moving object appearance information. Note that the identification information specification unit 230 may be configured to specify, based on "time" information of the moving object appearance information, the terminal ID for which a time period between the time when the appearance information was acquired and the current time is less than a predetermined value. Note that, when a vehicle such as an automobile is targeted as a "moving object", the moving object specification unit 210 may be configured to specify a category of the moving object based on image information. In this case, the identification information specification unit 230 may be configured to specify the terminal ID associated with the appearance information and the category specified by the moving object specification unit 210 in the moving object appearance information. Note that operations of the identification information specification unit 230 in the roadside apparatus 30 and of the identification information specification unit 430 in the server 40 are similar to the above-described operation of the identification information specification unit 230, and therefore explanation thereof will be omitted. Moreover, operation of the moving object specification unit 310 of the roadside apparatus 30 is similar to that of the moving object specification unit 210, and therefore explanation thereof will be omitted.

FIG. 6 shows a configuration of a data structure of terminal location information. The terminal location information associates the terminal ID and the current location information. Identification information of the information terminals 82 is recorded in "Terminal ID". Information representing current locations of the information terminals 82 is recorded in "Current Location Information". The current locations are information representing geographic locations of the information terminals 82. The terminal location information may be information managed by the radio station 50 as primary information. The radio station 50 may be configured to record information of position of the information terminal 82 measured by the radio station 50, as current location information. The radio station 50 may be configured to acquire information of position measured by the information terminal 82 itself with GPS (Global Positioning System), and to record it as current location information. The current location information may be transmitted from the radio station 50 to the server 40, the roadside apparatus 30, and the vehicle 20.

In the vehicle 20, the information processing apparatus 24 may be configured to receive, from the radio station 50 managing a communication area including the imaging area of the camera 22, the terminal location information of the information terminal 82 located in the imaging area of the camera 22. The identification information specification unit 230 may be configured to specify, based on the terminal location information received from the radio station 50 and information representing the imaging area of the camera 22, the terminal ID of the information terminal 82 carried by the person 80 whose appearance information has been extracted by the acquisition unit 220. As an example, when there is only one person 80 in the imaging area of the camera 22, and there is only one information terminal 82 in the imaging area of the camera 22 according to the terminal location information received from the radio station 50, the terminal ID of the information terminal 82 may be specified as the terminal ID of the information terminal 82 carried by the person 80 whose appearance information has been extracted by the acquisition unit 220. This allows the vehicle 20 to collect the moving object appearance information.

In the roadside apparatus 30, the information processing apparatus 34 may be configured to receive, from the radio station 50 managing a communication area including the imaging area of the camera 32, the terminal location information of the information terminal 82 located in the imaging area of the camera 32. The identification information specification unit 330 may be configured to specify, based on the terminal location information received from the radio station 50 and information representing the imaging area of the camera 32, the terminal ID of the information terminal 82 carried by the person 80 whose appearance information has been extracted by the acquisition unit 320, as with the identification information specification unit 230. This allows the roadside apparatus 30 to collect the moving object appearance information.

Note that, when the server 40 collects an image from the vehicle 20 and records moving object appearance information, the identification information specification unit 430 may be configured to specify, based on the information representing the imaging area of the camera 22 and the terminal location information received from the radio station 50, the terminal ID of the information terminal 82 carried by the person 80 whose appearance information has been extracted by the acquisition unit 420. Moreover, when the server 40 collects an image from the roadside apparatus 30 and records moving object appearance information, the identification information specification unit 430 may be configured to specify, based on the information representing the imaging area of the camera 32 and the terminal location information received from the radio station 50, the terminal ID of the information terminal 82 carried by the person 80 whose appearance information has been extracted by the acquisition unit 420.

Figure 7:
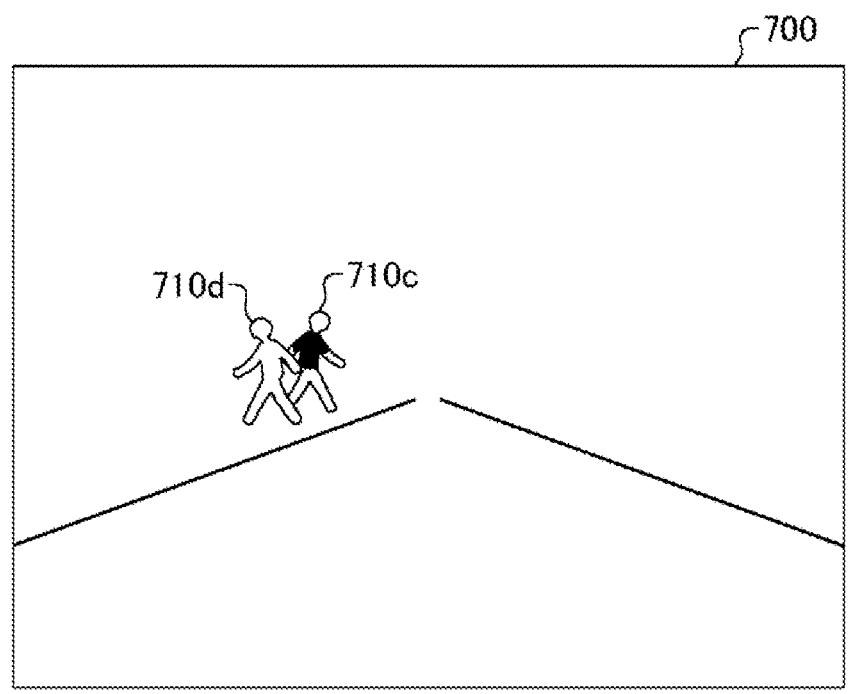
FIG. 7 shows an image 700 captured by a camera 22 included in the vehicle 20.

FIG. 7 shows an image 700 captured by the camera 22 included in the vehicle 20. The moving object specification unit 210 is configured to recognize an object 710c in the image 700 as an object of the person 80 that may hinder the traveling of the vehicle 20. Thus, the moving object specification unit 210 is configured to specify the person 80 captured as the object 710c, as a notification target. In the image 700, there is also an object 710d of a person in the vicinity of the object 710c. The person of the object 710d does not hinder the traveling of the vehicle 20. Therefore, the identification information specification unit 230 is configured to determine that the information terminal 82 of the person 80 to be notified cannot be specified as distinguished from the information terminal 82 of the person 80 not to be notified.

As such, the acquisition unit 220 is configured to extract information representing an appearance of the object 710c from the image 700. For example, the acquisition unit 220 is configured to extract information representing a color or a type of garment worn by the person 80 captured as the object 710c, whether a hat is worn, a color or a type of hat worn, or the like. For example, it is assumed that a feature of the garment extracted from the object 710c is a "red tee-shirt". In this case, if the "appearance information" is a "red tee-shirt" and "Location 1" is in the imaging area of the camera 22 with reference to the terminal location information shown in FIG. 6, the identification information specification unit 230 is configured to specify "ID 001" as the terminal ID that is associated with the appearance information matching the "red tee-shirt" in the moving object appearance information and that is associated with the current location information included in the imaging area of the camera 22 in the terminal location information. Thus, the identification information specification unit 230 is configured to specify the terminal ID of the information terminal 82 associated with the person 80 to be notified. Then, the notification control unit 240 is configured to cause the communication unit 290 to transmit the notification information addressed to the information terminal 82 identified by "ID 001".

Figure 8:
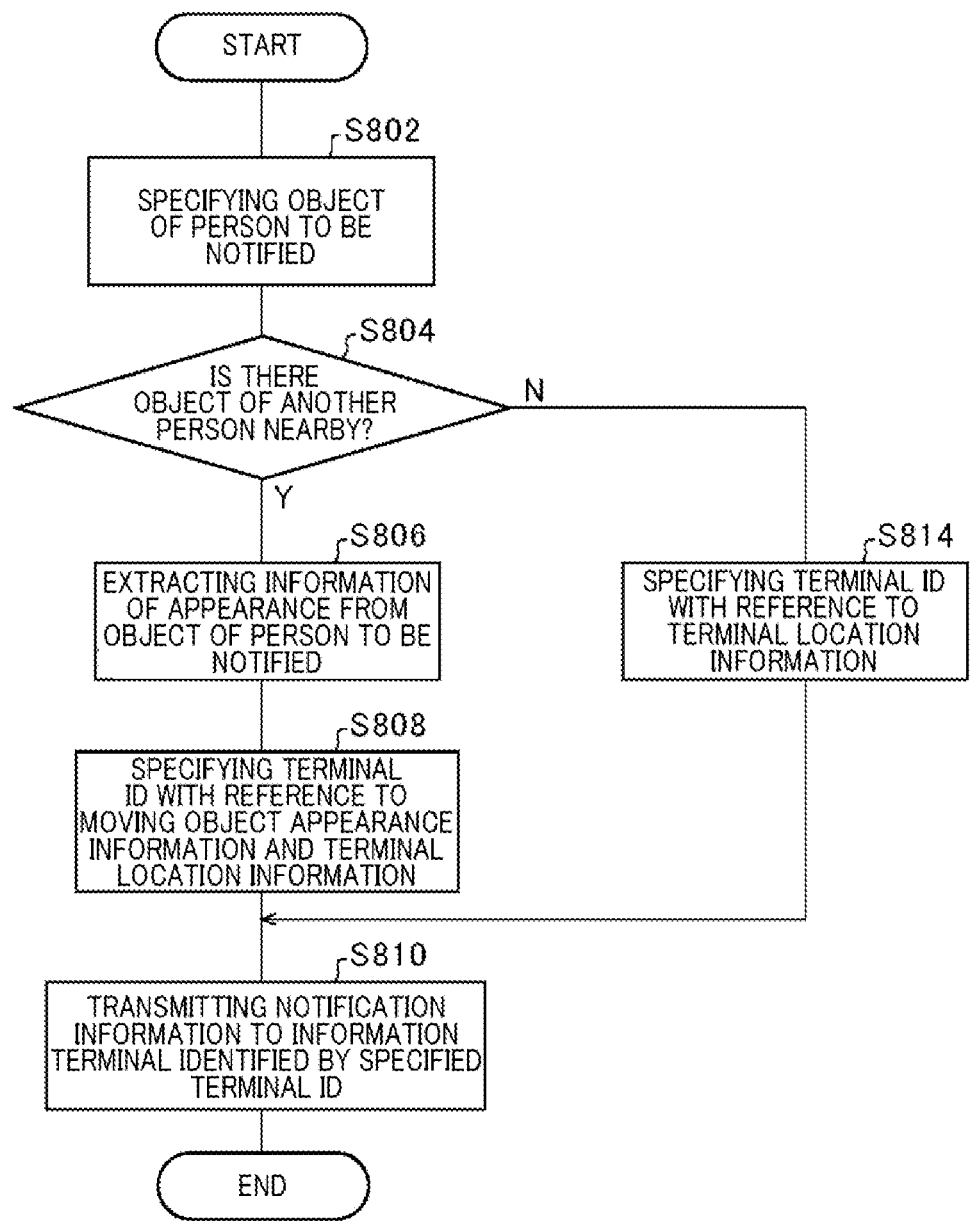
FIG. 8 shows a flow chart according to an information processing method executed by an information processing apparatus 24.

FIG. 8 shows a flow chart according to an information processing method executed by the information processing apparatus 24. This flow chart is started when the moving object specification unit 210 detects a person to be notified. In S802, the moving object specification unit 210 is configured to specify, on an image acquired by the camera 22, an object of the person 80 to be notified.

In S804, the moving object specification unit 210 is configured to determine whether there is an object of another person near the specified object of the person. When it is determined that there is an object of another person nearby, in S806, the acquisition unit 220 is configured to extract appearance information from the object of the person to be notified on the image. For example, the acquisition unit 220 is configured to extract a color of garment or accessory, a type of garment or accessory, or the like. In S808, with reference to the moving object appearance information and the terminal location information, specified is the terminal ID of the information terminal 82 carried by the person to be notified. Subsequently, in S810, the notification control unit 240 is configured to generate the notification information addressed to the terminal ID specified in S808, and to cause it to be transmitted from the communication unit 290.

In S806, when it is determined that there is no object of another moving object nearby, in S814, the identification information specification unit 230 is configured to specify the terminal ID of the information terminal 82 carried by the person to be notified, with reference to the terminal location information, and to advance the processing to S810.

Note that the information processing apparatus 34 of the roadside apparatus 30 may be configured to execute an information processing method similar to the one shown in the flow chart of FIG. 8. Therefore, a flow chart of information processing executed by the information processing apparatus 34 of the roadside apparatus 30 will be omitted.

As described above, according to the system 10, even when the information terminal 82 of the person to be notified cannot be specified only by the current location information of the information terminal 82, as in case where the persons 80 are closely spaced or the like, the information terminal 82 to be notified is specified by using the clothing information of the person 80. This allows the notification information to be transmitted only to the information terminal 82 required to be transmitted the notification information, and can prevent the notification information to be transmitted to the information terminal 82 required not to be transmitted the notification information.

Note that the vehicle 20 is an example of transportation equipment. The transportation equipment includes, for example, an automobile such as a passenger vehicle or a bus, a saddle-ride type vehicle, and a bicycle. Moreover, the moving object includes not only a person but also transportation equipment, for example, an automobile such as a passenger vehicle or a bus, a saddle-ride type vehicle, and a bicycle.

Figure 9:
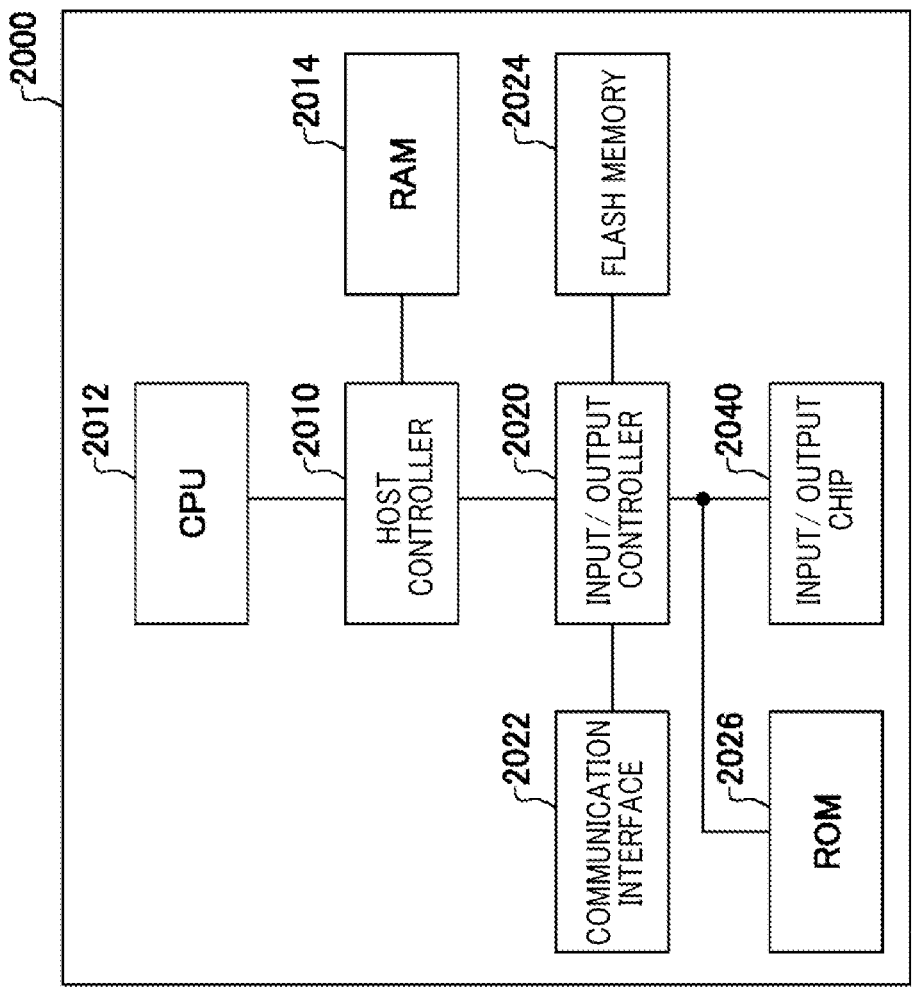
FIG. 9 shows an example of a computer 2000.

FIG. 9 shows an example of a computer 2000 where a plurality of embodiments of the present invention may be entirely or partially embodied. Programs installed in the computer 2000 can cause the computer 2000 to: function as apparatuses such as the information processing apparatus 24, the information processing apparatus 34, and the server 40 according to the embodiments, or each unit of said apparatuses; execute operations associated with said apparatuses or each unit of said apparatuses; and/or execute a process according to the embodiments or steps of said process. Such programs may be executed by a CPU 2012 in order to cause the computer 2000 to execute a specific operation associated with some or all of the processing procedures and the blocks in the block diagram described in this specification.

The computer 2000 according to this embodiment includes the CPU 2012 and RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, an HDMI (registered trademark) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014 or the ROM 2026, and are executed by the CPU 2012. Information processing written in these programs is read by the computer 2000, and provides cooperation between the programs and the various types of hardwares resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program. The communication interface 2022, under the control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute are stored in the recording medium, the CPU 2012 may retrieve, out of said plurality of entries, an entry with the attribute value of the first attribute specified that meets a condition, read the attribute value of the second attribute stored in said entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program installed in the computer 2000 and causing the computer 2000 to function as the information processing apparatus 24 may instruct the CPU 2012 or the like to cause the computer 2000 to function as each unit of the information processing apparatus 24. The information processing written in these programs are read by the computer 2000 to cause the computer to function as each unit of the information processing apparatus 24, which is a specific means realized by the cooperation of software and the various types of hardware resources described above. Then, these specific means implement operations or processing of information corresponding to the intended use of the computer 2000 in this embodiment, so that the information processing apparatus 24 is constructed as a specific information processing apparatus corresponding to the intended use.

Similarly, the program installed in the computer 2000 and causing the computer 2000 to function as the information processing apparatus 34 may instruct the CPU 2012 or the like to cause the computer 2000 to function as each unit of the information processing apparatus 34. The information processing written in these programs are read by the computer 2000 to cause the computer to function as each unit of the information processing apparatus 34, which is a specific means realized by the cooperation of software and the various types of hardware resources described above. Then, these specific means implement operations or processing of information corresponding to the intended use of the computer 2000 in this embodiment, so that the information processing apparatus 34 is constructed as a specific information processing apparatus corresponding to the intended use.

Similarly, the program installed in the computer 2000 and causing the computer 2000 to function as the information processing apparatus 34 may instruct the CPU 2012 or the like to cause the computer 2000 to function as each unit of the server 40. The information processing written in these programs are read by the computer 2000 to cause the computer to function as each unit of the server 40, which is a specific means realized by the cooperation of software and the various types of hardware resources described above. Then, these specific means implement operations or processing of information corresponding to the intended use of the computer 2000 in this embodiment, so that the server 40 is constructed as a specific server corresponding to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide a means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), Java (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or drawings can be performed in any order as long as the order is not clearly indicated by "prior to," "before," or the like and as long as the output from a previous process is not used in a later process. Even if the process flow is described using phrases such as "first" or "next" in the claims, embodiments, or drawings, it does not necessarily mean that the process must be performed in this order.

EXPLANATION OF REFERENCES

10: system
20: vehicle

21: sensor
22: camera
24: information processing apparatus
30: roadside apparatus
32: camera
34: information processing apparatus
40: server
50: radio station
80: person
82: information terminal
200: processing unit
210: moving object specification unit
220: acquisition unit
230: identification information specification unit
240: notification control unit
250: record control unit
280: record unit
290: communication unit
300: processing unit
310: moving object specification unit
320: acquisition unit
330: identification information specification unit
340: notification control unit
350: record control unit
380: record unit
390: communication unit
400: processing unit
420: acquisition unit
430: identification information specification unit
440: notification control unit
450: record control unit
480: record unit
490: communication unit
700: image
710: object
2000: computer
2010: host controller
2012: CPU
2014: RAM
2020: input/output controller
2022: communication interface
2024: flash memory
2026: ROM
2040: input/output chip

What is claimed is:

1. A system, comprising:
a record unit for recording identification information of an information terminal and appearance information of a moving object associated with the information terminal in association with each other;
an acquisition unit for extracting, from image information including a plurality of moving objects, appearance information representing an appearance of each of the plurality of moving objects to be notified; and
an identification information specification unit for specifying a matching information terminal based on terminal location information between the identification information recorded by the record unit in association with the appearance information, and the appearance information acquired by the acquisition unit.

2. The system according to claim 1, further comprising:
a notification control unit for causing notification to be given to the matching information terminal specified by the identification information specification unit.

3. The system according to claim 1,
wherein, the acquisition unit is configured to acquire, from image information of one or more additional moving objects including the moving object captured by an imaging apparatus, the appearance information representing the appearance of each of the plurality of moving objects to be notified.

4. The system according to claim 3, wherein
the image information is obtained by capturing a periphery of a vehicle.

5. The system according to claim 4,
wherein when the moving object is hindering a traveling of the vehicle, the acquisition unit is further configured to specify, from the image information obtained by capturing the periphery of the vehicle, the appearance information of the moving object hindering the traveling of the vehicle, and to acquire the specified appearance information as the appearance information of each of the plurality of moving objects to be notified.

6. The system according to claim 5, wherein
the moving object hindering the traveling of the vehicle is a person, and
the appearance information includes information representing clothing of the person.

7. The system according to claim 5, wherein
the acquisition unit and the imaging apparatus are provided in one of the vehicle and a roadside apparatus.

8. The system according to claim 3, wherein
when the matching information terminal of another moving object to be notified cannot be specified, the identification information specification unit is configured to specify identification information recorded by the record unit in association with appearance information which matches the appearance information acquired by the acquisition unit.

9. The system according to claim 3, wherein
when a number of the plurality of moving objects captured by the imaging apparatus exceeds a predetermined number, the identification information specification unit is configured to specify identification information recorded by the record unit in association with appearance information which matches the appearance information acquired by the acquisition unit.

10. The system according to claim 3, further comprising
a record control unit, which when identification information of the plurality of moving objects captured by the imaging apparatus can be specified, causes the record unit to record appearance information of the plurality of moving objects captured by the imaging apparatus and identification information of the plurality of moving objects captured by the imaging apparatus in association with each other.

11. The system according to claim 10, wherein:
the identification information specification unit specifies the matching information terminal when a number of the plurality of moving objects captured by the imaging apparatus does not exceed a predetermined number, and
the record control unit is configured to cause the record unit to record the appearance information extracted by the acquisition unit and the matching information terminal.

12. The system according to claim 11, wherein
the moving object is a person, and the information terminal is configured to be carried by the person,
the acquisition unit is further configured to extract the appearance information of the person from the image information captured when the person goes out from indoors to outdoors, and the record control unit is configured to cause the record unit to record the appearance information of the person extracted by the acquisition unit and the matching information terminal.

13. The system according to claim 10, wherein
the moving object is a person, and
the information terminal is configured to be carried by the person.

14. A non-transitory computer-readable storage medium having recorded thereon a program that causes a computer to function as:
  a record unit for recording identification information of an information terminal and appearance information of a moving object associated with the information terminal in association with each other;
  an acquisition unit for extracting, from image information including a plurality of moving objects, appearance information representing an appearance of each of the plurality of moving objects to be notified; and
  an identification information specification unit for specifying a matching information terminal based on terminal location information between the identification information recorded by the record unit in association with the appearance information, and the appearance information acquired by the acquisition unit.

15. An information processing method comprising:
recording identification information of an information terminal and appearance information of a moving object associated with the information terminal in association with each other;
extracting, from image information including a plurality of moving objects, appearance information representing an appearance of each of the plurality of moving objects to be notified; and
specifying a matching information terminal based on terminal location information between the identification information recorded during the recording in association with the appearance information, and the appearance information representing the appearance of the moving object to be notified.

* * * * *